Figure 1:
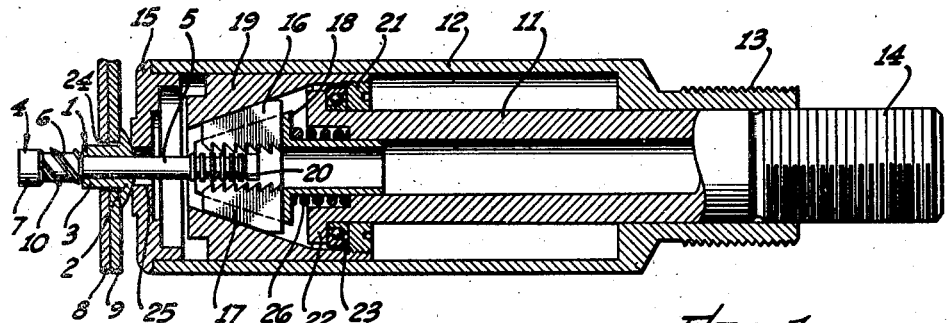

Sept. 30, 1947.    M. C. KETCHUM    2,428,165
TOOL FOR SETTING BLIND RIVETS
Filed May 5, 1945

INVENTOR.
MILO C. KETCHUM,
BY
ATTORNEY.

Patented Sept. 30, 1947

2,428,165

UNITED STATES PATENT OFFICE 2,428,165

TOOL FOR SETTING BLIND RIVETS

Milo C. Ketchum, Altadena, Calif., assignor to Cherry Rivet Company, Los Angeles, Calif., a corporation of California Application May 5, 1945, Serial No. 592,113

2 Claims. (Cl. 218—19)

My invention relates to blind rivets and has particular reference to a novel rivet construction and to a novel setting tool which may be employed to set the rivet into workpieces with which it is to be associated.

Blind rivets now in common use employ a rivet body having a head from which extends a hollow shank adapted to pass through aligned holes in sheets to be riveted together or in a sheet and a support to which it is to be attached. The rivet is provided with a mandrel extending through the hollow shank with an enlarged head extending beyond the end of the shank so that when the mandrel is pulled toward the rivet head the enlarged portion of the mandrel will engage the extending end of the stem and expand it radially, securing the rivet in the holes.

In many constructions the mandrel is formed with a stem portion projecting through the hollow shank of the rivet body having a diameter equal to the diameter of the bore of the rivet body and a slightly enlarged diameter portion is provided on the shank between the stem and the upsetting head for the purpose of radially expanding the entire shank as the mandrel is drawn axially through the rivet body. The radial expansion of the portions of the shank disposed within the holes of the sheets causes the rivet to completely fill the holes and secure a tighter and better riveting job. The protruding stem portion of the rivet is then broken off or cut off, leaving the balance of the mandrel permanently in position in the rivet body.

It frequently occurs that after the parts to which such rivets have been applied are put in use, vibration, temperature changes or other causes may so loosen the mandrel as to permit it to fall out of the rivet body, leaving the hole through the rivet body exposed.

In the copending application of Ernest H. Shaff, Serial No. 464,677, issued as Patent No. 2,385,886, on October 2, 1945, there is illustrated and described a blind rivet of the general character set forth above but in which the portion of the rivet mandrel adapted to remain within the rivet body after the rivet is set is provided with threads or helical ribs extending outwardly from the cylindrical surface of the mandrel in such fashion that during the rivet setting operation, by giving the rivet mandrel a rotational motion as well as an axial pull, such ribs will cut into the stem of the rivet body and provide, in addition to the friction between the rivet body and the mandrel, a substantial threading of the mandrel into the rivet body to insure against inadvertent displacement of the mandrel from the rivet body.

It is therefore an object of my invention to illustrate a rivet assembly of the general type disclosed and claimed in the Shaff application noted above but in which the thread or rib formed upon the rivet mandrel will be of a sufficiently high pitch as to cause the mandrel to be self-rotating when an axial pull is exerted upon the mandrel in the rivet setting operation, thus making the rivet mandrel self-threading into the rivet body and without requiring the use of a setting tool adapted to be given a rotary as well as axial motion.

Another object of my invention is to provide a setting tool which may be employed to set rivets of the character set forth in the preceding paragraph, in which a part of the setting tool is adapted to grip the mandrel and in which upon exerting an axial pull upon the gripping device the gripping device is free to rotate under the influence of the threading of the rib or thread of the mandrel into the shank of the rivet body.

Figure 2:
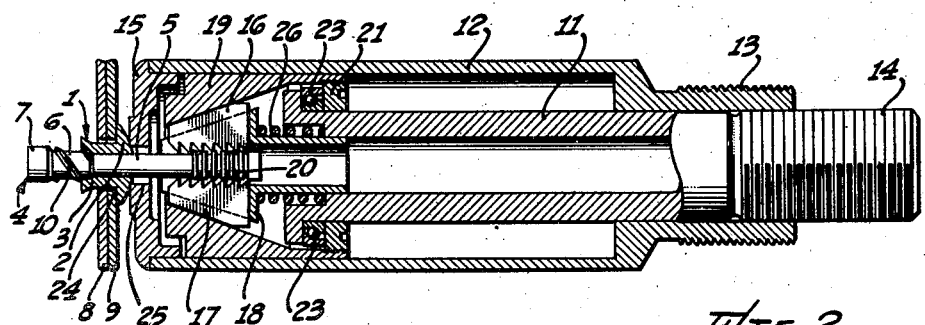
Figure 3:
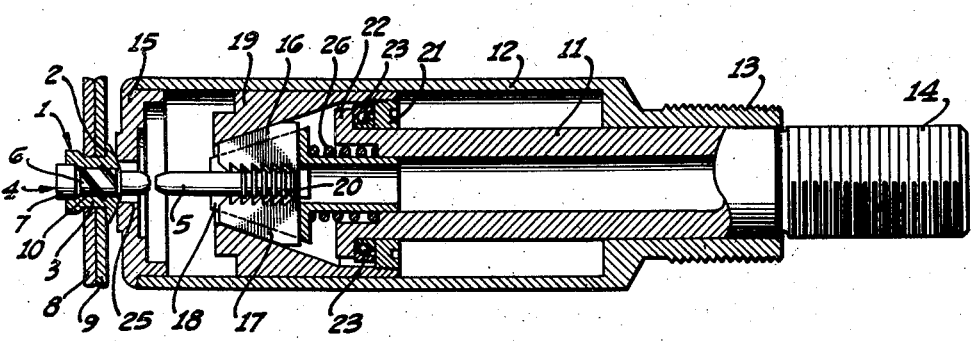

Other objects and advantages of my invention will be apparent from a study of the following specifications, read in connection with the accompanying drawings, wherein Fig. 1 is a longitudinal sectional view taken through a rivet construction embodying the principles of my invention and through a setting tool adapted to cooperate therewith, illustrating the position of the parts ready for setting the rivet in a pair of metal sheets;

Fig. 2 is a view similar to Fig. 1 but illustrating the position of the parts during the early stages of drawing the mandrel through the rivet body; and Fig. 3 is a view similar to Figs. 1 and 2 but illustrating the position of the parts at the termination of the rivet setting operation.

Referring to the drawings, I have illustrated a rivet construction which includes a rivet body 1 having a head 2, from which projects a hollow shank 3, through the bore of which is disposed a mandrel 4 having a stem portion 5 extending through the bore of the shank and having a diameter approximately equal to the diameter of the bore. At the end of the shank the mandrel is provided with an enlarged diameter portion indicated at 6, the length of which is preferably slightly shorter than the over-all length of the rivet body while a still further enlarged portion 7 forms an upsetting head adapted to expand that part of the body shank which protrudes beyond the sheets 8 and 9 which are to be secured together by the rivet.

About the enlarged portion 6 I provide one or more helical ribs 10 having a relatively high pitch such that when the stem is drawn through the shank the pitch of the threads will be sufficient to cut into the shank and to rotate the shank in such fashion that the exertion of only an axial pull on the stem 5 will result in the mandrel threading itself into the shank of the rivet body.

The setting tool illustrated as adapted to set this type of rivet is of the general type illustrated and described in the copending application of Herbert W. Kugler, Serial No. 575,205, in which a draw bolt 11 is mounted in a draw bolt guide 12 for longitudinal relative reciprocation by any suitable hand or power tool having a stationary portion connectible to the coupling 13 on the draw bolt guide and a reciprocating member coupled to the coupling 14 formed upon the protruding end of the draw bolt.

The draw bolt guide 12 is adapted to carry an anvil 15 which bears against the head 2 of the rivet body to hold the body in place in the holes of the work sheets 8 and 9 while the mandrel is being drawn through the shank by the draw bolt 11.

The draw bolt 11 is provided with a stem gripping chuck mechanism comprising a pair of wedge-shaped gripping jaws 16 and 17 disposed on diametrically opposite sides of a jaw carrier 18, the jaws being enclosed within a jaw contracting member 19 having a tapered internal bore against which the tapered outer edges of the jaws 17 and 16 may bear so that as the draw bolt is moved to the right, as viewed in Fig. 1, the contracting member 19 will cause the jaws to move toward each other and to grip between them the protruding end of the mandrel shank 5. If desired, the outer end of the shank 5 may be provided with threads or ribs as indicated at 20 to permit a more firm grasp of the shank by the serrated inner edges of the jaws 16 and 17 though by employing jaws having serrations as indicated in Fig. 1, a smooth shank may be successfully used.

To permit the rotation of the mandrel relative to the rivet body as an axial pull is exerted by the draw bolt 11, I provide a rotatable coupling for mounting the stem gripping mechanism upon the draw bolt for ready rotation relative thereto as by securing in the inner end of the contracting member 19 an annular bushing 21 and I form a radially extending flange 22 on the outer end of the draw bolt 11, the flange and bushing overlying each other so as to permit the exertion of an axial pull between the draw bolt and the contracting member 19 but leaving the contracting member free to rotate relative to the draw bolt 11. I prefer to interpose between the flange 22 and the bushing 21 a ball or roller bearing indicated at 23 to reduce the frictional resistance to the ready rotation of the chuck structure.

It will be apparent from the foregoing that the assembled rivet and mandrel can be projected through the aligned holes 24 in the work sheets 8 and 9 in the position shown in Fig. 1 and the setting tool may then be placed upon the stem of the rivet mandrel, the anvil 15 being disposed against the rivet head while the stem 5 projects through an aperture 25 in the anvil toward the clutch mechanism. Movement of the draw bolt 11 toward the rivet head will cause the end of the stem 5 to engage and separate the jaws 16 and 17 sufficiently to permit the stem to pass between them, the jaws and carrier 18 retracting toward the draw bolt 11 against the force of a spring 26.

Movement of the draw bolt 11 to the right, as viewed in Fig. 1, will cause the jaws to securely grip the stem 5 and to pull the mandrel 4 inwardly of the rivet body 1. As the pulling action takes place, the enlarged portion 6 of the mandrel will be drawn into the shank bore of the rivet body, causing the shank 3 to be radially expanded into tight gripping relation in the holes 24. At the entry of the enlarged portion 6 into the rivet body shank the threads or ribs 10 will engage and cut into the material of the shank, producing a rotary motion between the rivet body and mandrel as the movement progresses. Due to the fact that the clutch mechanism on the draw bolt 11 is free to rotate, the rotation of the mandrel under the influence of the ribs 10 is permitted without requiring any rotary motion to be imparted thereto by the setting tool for use with any of the reciprocating power or hand mechanisms now employed for setting hollow rivets.

As the motion of the mandrel continues, the upsetting head 7 will be drawn against the end of the shank 3 and will further radially expand the shank, upsetting the end of the shank over the edges of the holes 24, the rivet body and mandrel assuming the positions shown in Fig. 3, the mandrel now being not only frictionally engaged with the rivet body but threaded into the rivet body bore upon threads which have been cut in the rivet body by the ribs or threads 10 on the mandrel. A further axial pull exerted by the draw bolt will cause the stem to break, as indicated in Fig. 3, after which the setting tool is removed and the protruding end of the broken shank will be cut or filed flush with the surface of the rivet body head 2.

It will be apparent from the foregoing that the rivet structure will provide a greater insurance against inadvertent loss of the mandrel from the rivet body and that by making the setting tool in the manner described the rivet structure is permitted to be self-threading without the necessity of imparting any rotary force to the rivet mandrel during the setting operation.

While in the foregoing description it has been presumed that the bore in the rivet body will be smooth, it may be desirable to provide a thread in the rivet body bore corresponding to the helical thread or rib 10 and the setting tool described herein will be equally adapted to pulling a threaded mandrel into a threaded bore provided the pitch of the threads is sufficiently high to produce the necessary rotary forces for rotating the mandrel and rivet body relative to each other when only an axial pull is exerted between them.

While I have shown and described the preferred embodiment of my invention, I do not desire to be limited to any of the details of construction shown and described herein, except as defined in the appended claims.

I claim:

1. In a tool for setting blind rivets of the type including a rivet body and a mandrel having a helical thread extending about a portion of the mandrel to be drawn into the body, the combination of an anvil adapted to be placed against the head of the rivet body and having an aperture through which a portion of the mandrel may extend, a draw bolt mounted for reciprocation toward and away from said anvil, jaw means for engaging a rivet mandrel, and means rotatably mounting said jaw means upon said draw bolt including a friction reducing bearing interposed therebetween whereby an axial pull exerted on said draw bolt will draw the mandrel into the rivet body and allow rotation between the mandrel and rivet body by the thread on the mandrel.

2. In a tool for setting blind rivets of the type including a rivet body and a mandrel having a helical thread extending about a portion of the mandrel to be drawn into the body, the combination of an anvil adapted to be placed against the head of the rivet body and having an aperture through which a portion of the mandrel may extend, a draw bolt mounted for reciprocation toward and away from said anvil, jaw means for engaging a rivet mandrel, a rotatable coupling interconnecting said jaw means and said draw bolt for free rotation of the jaw means relative to the draw bolt whereby an axial pull exerted on said draw bolt will draw the mandrel into the rivet body and allow rotation between the mandrel and rivet body by the thread on the mandrel.

MILO C. KETCHUM.

REFERENCES CITED

The following references are of record in the file of this patent:

UNITED STATES PATENTS

| Number | Name | Date |
| --- | --- | --- |
| 2,385,886 | Shaff | Oct. 2, 1945 |
| 2,384,321 | Lees, Jr. | Sept. 4, 1945 |
| 2,336,058 | Bettington | Dec. 7, 1943 |
| 2,053,719 | Huck et al. | Aug. 8, 1936 |
| 1,784,755 | Rosenberg | Dec. 9, 1930 |

FOREIGN PATENTS

| Number | Country | Date |
| --- | --- | --- |
| 737,284 | France | Dec. 9, 1932 |